(12) United States Patent
Malakuti

(10) Patent No.: US 8,847,750 B1
(45) Date of Patent: Sep. 30, 2014

(54) NETWORK OF DUAL TECHNOLOGY OCCUPANCY SENSORS AND ASSOCIATED LIGHTING CONTROL METHOD

(75) Inventor: Kaveh Malakuti, Vancouver (CA)

(73) Assignee: Universal Lighting Technologies, Inc., Madison, AL (US)

( * ) Notice: Subject to any disclaimer, the term of this patent is extended or adjusted under 35 U.S.C. 154(b) by 521 days.

(21) Appl. No.: 13/173,224

(22) Filed: Jun. 30, 2011

(51) Int. Cl.
*G08B 19/00* (2006.01)
*G08B 13/18* (2006.01)
*G05F 1/00* (2006.01)
*H05B 37/02* (2006.01)
*H05B 39/04* (2006.01)

(52) U.S. Cl.
USPC ........... 340/522; 340/521; 340/552; 340/555; 315/294; 315/297; 315/307

(58) Field of Classification Search
USPC .......... 340/521, 522, 552, 555; 315/294, 297, 315/307; 362/802, 276; 381/56, 57
See application file for complete search history.

(56) References Cited

U.S. PATENT DOCUMENTS

| | | | |
|---|---|---|---|
| 5,189,393 A | | 2/1993 | Hu |
| 5,331,308 A | | 7/1994 | Buccola et al. |
| 5,386,210 A | * | 1/1995 | Lee ............................. 340/567 |
| 5,701,117 A | * | 12/1997 | Platner et al. ................. 340/567 |
| 5,764,146 A | * | 6/1998 | Baldwin et al. ............... 340/567 |
| 6,624,750 B1 | * | 9/2003 | Marman et al. ............... 340/506 |
| 6,791,458 B2 | | 9/2004 | Baldwin |
| 6,794,831 B2 | * | 9/2004 | Leeb et al. .................... 315/307 |
| 6,956,473 B2 | * | 10/2005 | Hanood ......................... 340/522 |
| 8,029,155 B2 | * | 10/2011 | Van De Ven et al. .......... 362/231 |
| 8,035,320 B2 | * | 10/2011 | Sibert ........................... 315/312 |
| 8,068,025 B2 | * | 11/2011 | Devenyi et al. ............... 340/540 |
| 8,164,484 B2 | * | 4/2012 | Berger et al. .................. 340/943 |
| 8,362,713 B2 | * | 1/2013 | Recker et al. ................. 315/293 |
| 2007/0182581 A1 | * | 8/2007 | Elwell ....................... 340/825.36 |
| 2008/0191630 A1 | * | 8/2008 | Peng ............................. 315/158 |
| 2008/0273754 A1 | * | 11/2008 | Hick et al. ..................... 382/103 |

OTHER PUBLICATIONS

U.S. Appl. No. 12/116,185, filed May 27, 2011, for "Networked, Wireless Lighting Control System With Distributed Intelligence" Applicant: Brian P. Platner.

* cited by examiner

*Primary Examiner* — Daniel Wu
*Assistant Examiner* — Mohamed Barakat
(74) *Attorney, Agent, or Firm* — Waddey Patterson; Mark J. Patterson; Gary L. Montle

(57) ABSTRACT

An occupancy detection network controls illumination from lighting devices in each of a plurality of defined areas. Motion detection modules and sound detection modules provide output signals based on detected occupancy in each defined area. The sound detection modules automatically adjust sorting criteria over time in accordance with identified sound characteristics associated with occupancy, detect sound in the associated defined area in accordance with the sorting criteria, and provide an output signal based on the detected sound. A central lighting controller is linked to the detection modules via a common bidirectional data bus. The controller receives an output signal, determines an occupancy state for the associated defined area, and controls lighting devices in the area to be turned on and off in accordance with the determined occupancy state.

12 Claims, 4 Drawing Sheets

NETWORK OF DUAL TECHNOLOGY OCCUPANCY SENSORS AND ASSOCIATED LIGHTING CONTROL METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

BACKGROUND OF THE INVENTION

The present invention relates generally to systems and methods for controlling illumination in a plurality of defined areas. More particularly, the present invention relates to a network of occupancy sensors capable of detecting a human presence and a network lighting controller for regulating illumination levels in a plurality of defined areas based on detected occupancy.

The use of occupancy sensors in lighting control has been on a steady increase as the industry advances towards more drastic energy conservation measures. Conventional occupancy sensors utilize various detection methods for detecting occupancy in a defined area. Among the known methods, passive infrared (PIR), microwave Doppler shift, ultrasonic Doppler shift and sound sensors are the most common.

Passive infrared (PIR) sensors are considered to be the most common type of occupancy sensor. They are able to "see" heat emitted by occupants. Triggering occurs when a change in infrared levels is detected—for example when a warm object moves into or out of view with respect to the sensor's eyes. PIR sensors are very resistant to false triggering. Although some PIR sensors have an operating range of up to 35 feet in specific directions under ideal conditions, they are most reliable within a 15-foot range. This is due to the blind spots between their wedge-shaped sensory patterns becoming wider with distance. The sensor is most sensitive to movement laterally across the field of view. They are passive—they do not send out any signal- and depend on the intensity of the heat from the moving part of the subject, which attenuates by the square of the distance.

PIR occupancy sensors typically use PIR elements with two to six sensing areas. The Fresnel lenses focus a projection of the defined area on the PIR element. The output of each sensing area on the PIR element is amplified electronically. Differential amplification is used so that a higher common-mode rejection ratio (CMRR) may be achieved. The CMRR measures the tendency of a device to reject input signals common to both input leads, and is defined as the ratio of the powers of the differential gain over the common-mode gain, as measured in positive decibels. In other words, differences between values of different sensing areas of the PIR element are amplified and the common factor, which is present due to IR emissions from other surfaces and objects, is rejected in the amplifier. Thus, once a heat-emitting source crosses the sensitive areas, the projection is drifted from one PIR area to another. This will result in a pulse at the output of the amplifier. The pulse is then compared to a desired threshold to filter the effect of thermal and electronic noises. Various coverage patterns could be achieved via modifications to the construction of the Fresnel lens.

There has been an extensive amount of research and development conducted to implement and improve performance and accuracy of occupancy detection. Accordingly, various sensing technologies employ two or more detection methods in a single system in order to reduce false tripping. Dual technology occupancy sensors generally use an active sensing method in combination with a PIR element. Microwave and ultrasound are the most widely used technologies. Both methods rely on processing Doppler shifts between the frequency of the transmitted and reflected signals.

To achieve a completely passive dual technology sensor, a design as previously known in the art employs a PIR sensor as the main detector and a microphone as a second detector. This enhances the accuracy of the sensor through detecting spontaneous changes in the amplitude of the noise in the defined area. The signal from the microphone is amplified by an automatic gain control amplifier, and accordingly consistent background noises are filtered out. The microphone module is activated by the PIR module, or in other words the lights will be turned on once the PIR element senses a motion. Once in the ON state, either one of the PIR or microphone modules will keep the lights in the ON state. Once motion has not been sensed for a predetermined period of time (timeout), the lights will be put into the OFF state and a grace period timer will start. During this period, the lights could be reverted into the ON state by a signal from the microphone as well as from the PIR module. Once in the OFF state, the microphone will not regulate the lights into the ON state. It is the PIR module that reinitiates the ON state and also activates the microphone.

However, occupancy sensors and associated systems or networks as are conventionally known in the art still typically share a common failure with regards to false triggering of the various sensors. For example, sensors may fail to detect occupants and trigger the lights off while the area is still occupied. Ambient noise in a defined area may also be an issue for conventional systems, particularly infrequent sounds which are not necessarily cyclical and thereby easily distinguishable from occupancy in the area. In addition, where an array of microphones is used to detect sound in the defined area but the received sound signals are collectively analyzed as is typically known in the art, cross-correlation of the signals may be relatively low.

BRIEF SUMMARY OF THE INVENTION

An occupancy detection network and associated method for controlling illumination in a plurality of defined areas is provided in accordance with the present invention. In a particular aspect, the network and method control illumination generated by associated lighting devices to regulate an amount of illumination (i.e., natural and artificial light) present in each of the plurality of defined areas.

In an embodiment, an occupancy detection network is provided in accordance with the present invention for controlling illumination from lighting devices in each of a plurality of defined areas. Motion detection modules and sound detection modules provide output signals based on detected occupancy in each defined area. The sound detection modules automatically adjust sorting criteria over time in accordance with identified sound characteristics associated with occupancy, detect sound in the associated defined area in accordance with the sorting criteria, and provide an output signal based on the detected sound. A central lighting controller is linked to the detection modules via a common bidirectional data bus. The controller receives an output signal, determines an occupancy state for the associated defined area, and controls lighting devices in the area to be turned on and off in accordance with the determined occupancy state.

In another embodiment, a central lighting controller includes a processor and a machine-readable memory having a plurality of instructions residing thereon. The instructions are executable by the processor to cause the central lighting controller to perform various steps in accordance with a method of operation of the present invention. The controller receives an output signal from one of a plurality of motion detection modules and sound detection modules positioned among a plurality of defined areas. The detection modules each have an address associated with a defined area in which it is positioned, and collectively define a network of detection modules functionally linked to each other and to the controller via a common data bus. The controller determines which of the plurality of detection modules sent the output signal and the address associated with said detection module, determines an occupancy state associated with the address, and controls lighting devices in the defined area associated with the address to be turned on and off in accordance with the determined occupancy state.

DETAILED DESCRIPTION OF THE INVENTION

Figure 1:
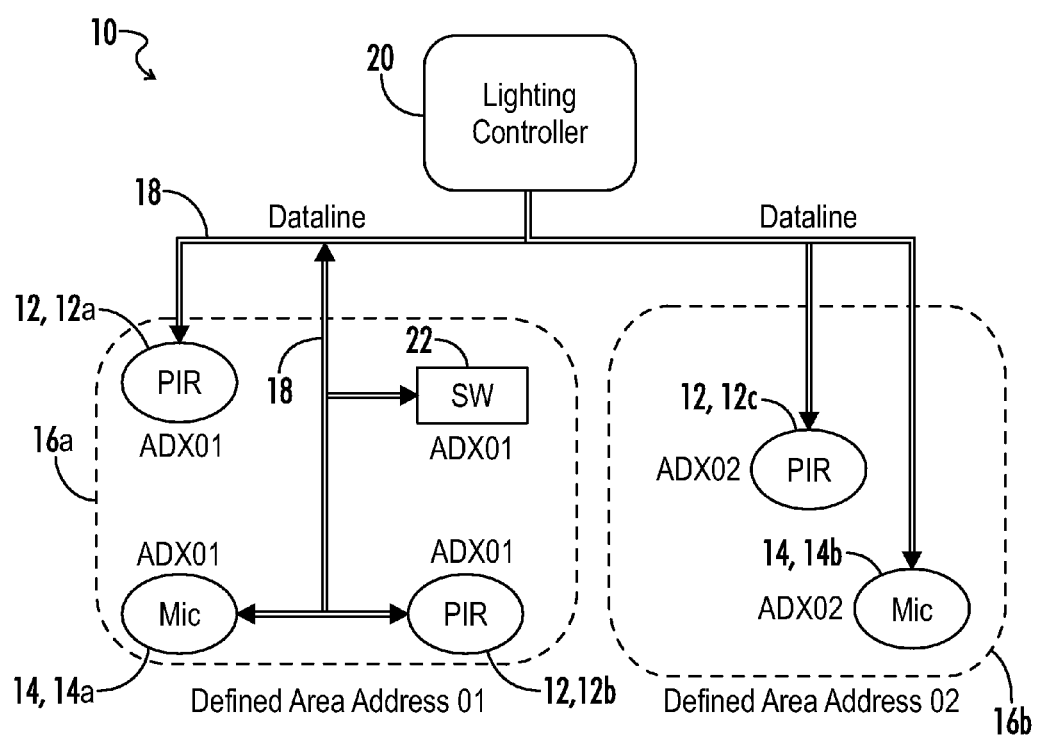
FIG. 1 is a block diagram representing an embodiment of an occupancy detection network in accordance with the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-5, various embodiments of an occupancy detection network and associated methods of controlling illumination in a plurality of defined areas having occupancy detectors positioned therein may now be described. The network of occupancy detectors cooperatively sense the presence of occupants in each area, while a central controller regulates functionality of the various detectors and a level of illumination in the associated areas based on the detected occupancy states. Where the various figures may describe embodiments sharing various common elements and features with other embodiments, similar elements and features are given the same reference numerals and redundant description thereof may be omitted below.

Referring first to FIG. 1, in an embodiment an occupancy detection network 10 may include one or more motion detection modules 12 and sound detection modules 14 residing in various locations within each of a plurality of defined areas 16, each defined area being assigned an address which is further assigned to each associated detection module 12, 14. The motion detection modules 12 and sound detection modules 14, along with any manual switches 22 further located in one or more of the defined areas 16, may be electrically coupled to a central lighting controller 20 via a data communications line 18. In an alternative embodiment, a plurality of motion detection modules 12 may be positioned in a particular area without including any sound detection modules 14.

In various embodiments the data communications line as used herein with respect to data communication between the various elements may generally refer to a wired bidirectional data bus, but alternatively or in addition may refer to any wired or wireless networks, network links and intermediate communication interfaces effective to transmit and receive data as required in accordance with the features defined below.

Figure 2:
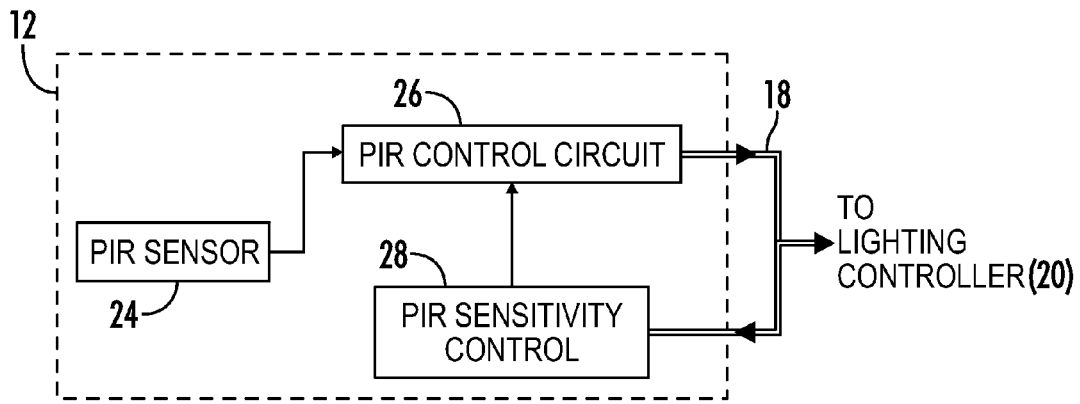
FIG. 2 is a block diagram representing an embodiment of a motion detection module used in the network of FIG. 1.

As represented in FIG. 2, a motion detection module 12 may include a motion detector 24 which in various embodiments may be a passive infra-red (PIR) sensor 24, but may be formed of various alternative and equivalent sensors as are known in the art within the scope of the present invention. In an embodiment, the motion detection module 12 further includes a motion detector control circuit 26 effective to determine an occupancy state in an associated defined area and generate an output signal accordingly, and a sensitivity controller 28. In alternative embodiments these elements and associated functions may be integrated in a single control circuit (not shown) for the module 12, or in the motion detector itself, or may even reside in a separate housing or module within the scope of the present invention.

Figure 3:
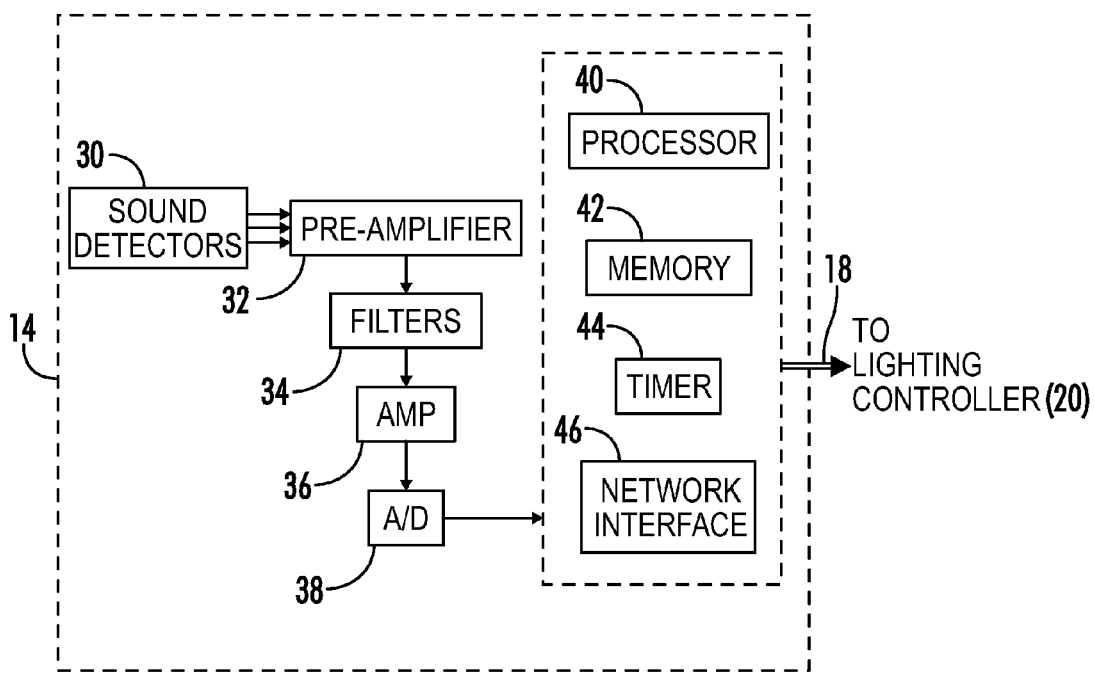
FIG. 3 is a block diagram representing an embodiment of a sound detection module used in the network of FIG. 1.

As represented in FIG. 3, a sound detection module 14 may be a standalone detection system including one or more sound detectors 30 which in various embodiments are formed of a microphone array effective to generate a plurality of output signals (or in equivalent manner a single multi-channel output signal). Each of the plurality of microphones in the array may generally be omnidirectional, but may alternatively be bidirectional, unidirectional or the like within the scope of the invention. The sound detectors 30 are further not limited to a microphone array but may be formed of various alternative and equivalent sensors as are known in the art. The sound detectors 30 may be coupled to an analog circuit including, for example, a pre-amplifier 32, analog filters 34, an amplifier 36, and an analog-to-digital converter 38 as will be described in greater detail below.

The analog circuit may further provide the output signals (having been filtered, amplified, etc.) to a sound processor or analyzer 40 (or local control circuit 40) effective to determine an occupancy state in the defined area and generate an output signal associated with the determined occupancy state, in a manner as further described below. A "sound analyzer feature" or "sound analyzing process" as referred to herein may generally include the various sound signal analyzing functions as further described below to process data provided from the analog sound detection circuit 14, and components 32, 34, 36, 38. The sound analyzer 40 may be y a processor or a combination of circuit components including the processor. The sound analyzer 40 may be caused by firmware or instructions residing in a memory unit 42 to perform the various steps of the sound analyzing feature, as well as an internal timer 44 and a lighting control network interface 46.

The terms "lighting controller" 20 or "lighting control circuit" 20 as used herein may refer to processing circuitry including one or more of a general microprocessor, an application specific integrated circuit (ASIC), a digital signal processor (DSP), a microcontroller, a field programmable gate array, and/or various alternative blocks of discrete processing circuitry, and any pre-processing modules or other such circuitry as may be designed as is known in the art to perform functions as further defined herein. In an embodiment of the present invention the controller 20 may be formed of processing circuitry and program instructions or firmware which is integrally embodied therewith. In other embodiments, the processing circuitry may be separately embodied but functionally linked to a processor-readable memory medium having program instructions or firmware residing thereon and which is executable by the processor to perform functions as further defined herein.

In addition to the occupancy detectors 12, 14 and any manual switches 22, the lighting controller 20 may in various embodiments (not shown) be coupled to receive input signals from one or more other external sources including for example knobs and DIP switches, a wireless receiver and an ambient light detector such as a photocell. The controller 20 may be effective to perform various functions as further defined below in accordance with the received signals, and to generate output signals for one or more external devices including for example an LED status indicator, a timeout audio indicator, relay outputs and one or more lighting devices driven on and off via driver signals from the controller (or alternatively via signals or pulses provided by an external and intermediate device which is configured to receive one or more the aforementioned signals).

Figure 4:
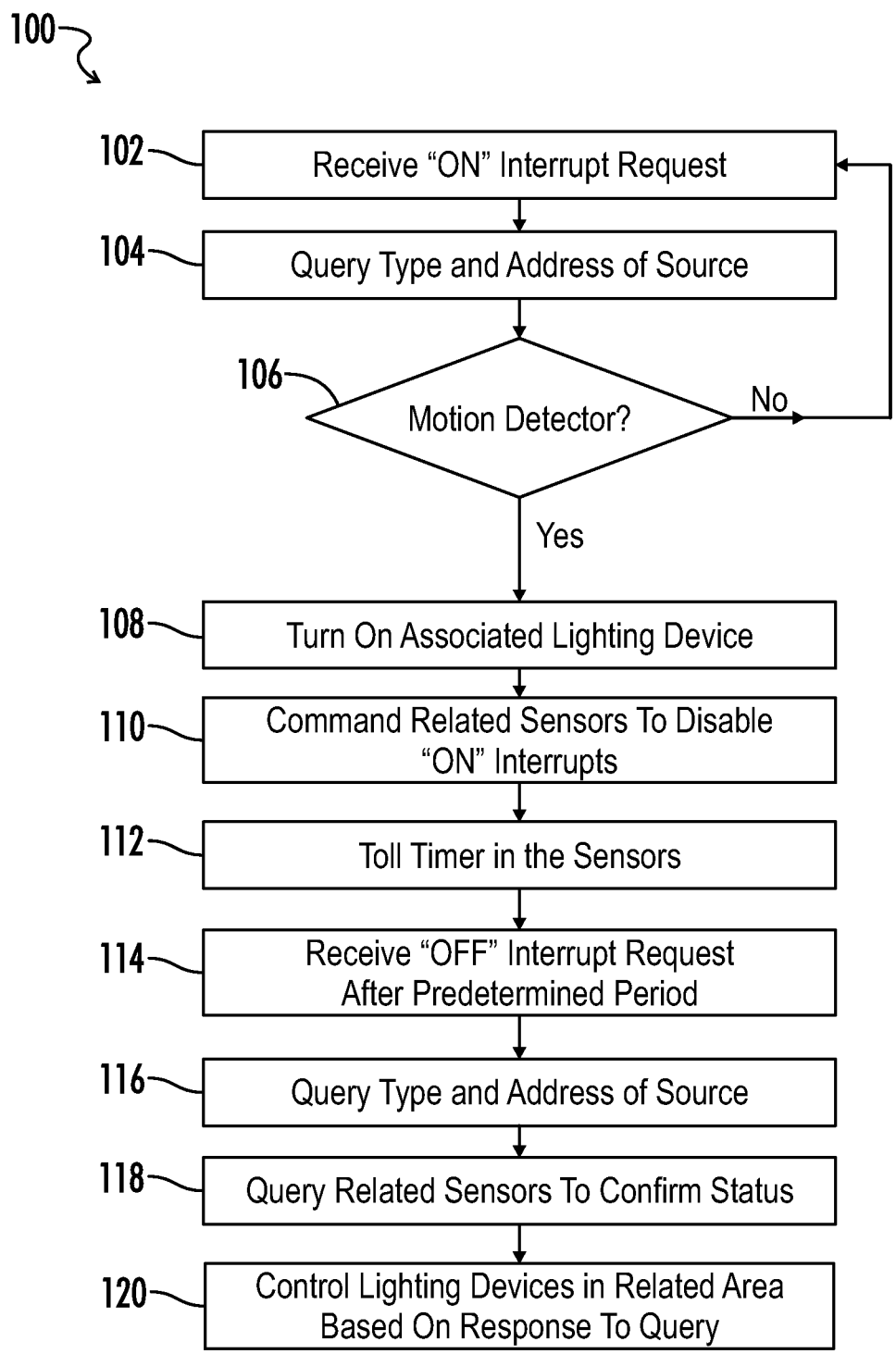
FIG. 4 is a flowchart representing an embodiment of an operational method of the network of FIG. 1.

Referring now to FIG. 4, an operational method 100 or process 100 may now be described in accordance with embodiments of an occupancy detection network 10 of the present invention. The method 100 may be described herein with respect to one of a plurality of defined areas associated with a lighting controller (e.g., with the understanding that the operational method for each defined area is substantially similar although varying potentially with respect to the number and type of detection modules located therein.

With the lighting devices in a particular defined area initially turned off, each detection module 12, 14 in the area is configured to determine an occupancy state and to accordingly generate and transmit an ON interrupt request to the lighting controller 20 upon first detection of a human presence in the OFF state. The interrupt request (ON or OFF) may be equivalent to an input signal received a manual wall switch with respect to the central controller, or may alternatively be embodied as part of a data string or data package wherein the central controller determines the interrupt request via decoding of the input data. The central lighting controller receives the ON interrupt request (step 102) and subsequently queries each detection module in the network to determine a type and address of the source (step 104). In an embodiment, these first two steps 102, 104 may be performed in a single step with respect to the source module where for example the ON interrupt request may be provided as part of a data string that includes the type and address of the source module.

If the lighting controller determines that the source of the ON interrupt request is not a motion detection module (i.e., "no" in response to the query of step 106), the process returns to step 102 and repeats until another ON interrupt request is received by the controller.

In an embodiment (not shown), the lighting controller may first query other detection modules in the defined area to determine if any motion detection modules are in an ON state (indicating that motion associated with a human presence has been detected). If at least one motion detection module is determined to be in the ON state, the process continues to step 108 rather than returning to step 102.

If the lighting controller determines that the source of the ON interrupt request is a motion detection module (i.e., "yes" in response to the query of step 106), the lighting controller responds by turning on one or more lighting devices (or cause them to be turned on by generating driver signals to an intermediary control device) which are located in or otherwise provide illumination for the defined area associated with the address of the source module (step 108).

Once in the ON state, the lighting controller may then generate and issue a command to each detection module having the same address to disable or otherwise not generate further ON interrupt requests (step 110). Each detection module upon receiving the command further may toll an internal timer that is set to expire after an adjustable predetermined period of no detected activity in the defined area that may be associated with human occupancy (step 112). Upon expiration of the predetermined period of time, the detection module is configured to send an OFF interrupt request to the lighting controller (step 114). As previously described, the OFF interrupt request may take the form of an input signal received from a manual wall switch with respect to the central controller, or may alternatively be embodied as part of a data string or data package wherein the central controller determines the interrupt request via decoding of the input data.

The lighting controller then queries the network for the type and address of the source of the OFF interrupt request (step 116). In an embodiment, steps 114 and 116 may be performed in a single step with respect to the source module where for example the OFF interrupt request may be provided as part of a data string that includes the type and address of the source module. Once the address of the source has been determined, the lighting controller queries the status and type of each other detection module having the same address as the source module (step 118). The "status" as referred to herein may generally be defined as an ON status associated with an occupancy state or otherwise a detected human presence in the defined area, or an OFF status associated with a non-occupancy state or otherwise no detected human presence in the defined area.

Based on responses to the query of step 118, the lighting controller may then control the one or more lighting devices associated with the defined area to be turned off or left on (step 120).

In one example of step 120, the lighting devices associated with a defined area are presently in an ON state. A sound detection module sends an OFF interrupt request to the lighting controller, which then queries other detection modules in the defined area. If at least one motion detection module in the defined area is in the ON state (indicating that motion associated with a human presence has been detected), the lighting devices are kept ON by the controller. Alternatively, if all motion detectors in the defined area are determined to be in the OFF state, the lighting controller controls the lighting devices (either directly or via an intermediate driver circuit as previously noted) to be turned OFF. This step may for example be performed regardless of confirmation with regards to other sound detection modules in the defined area.

Figure 5:
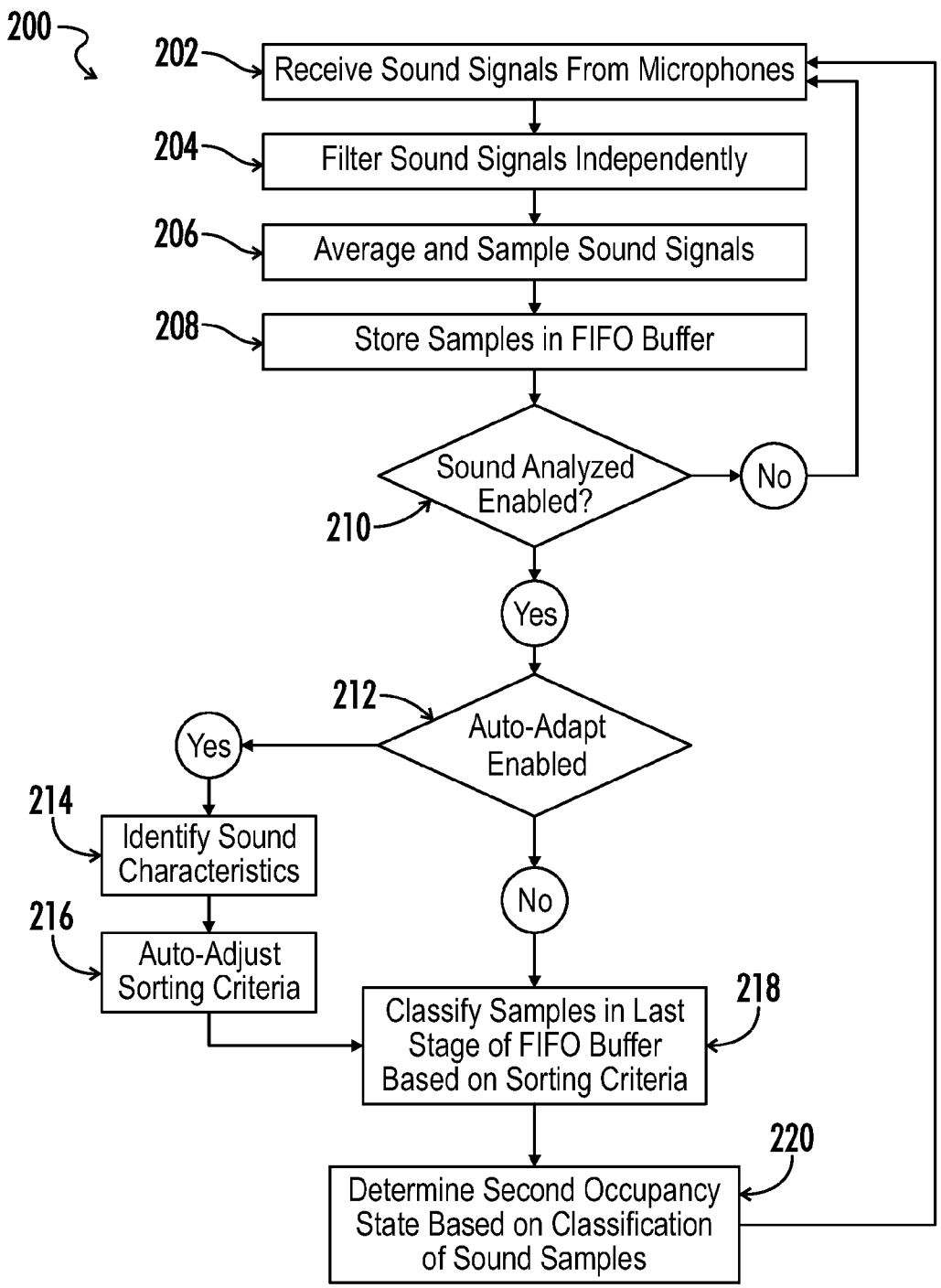
FIG. 5 is a flowchart representing an embodiment of an operational method of the sound detection module of FIG. 3.

Referring now to FIG. 5, an embodiment of a sound analyzer process 200 for determining an occupancy state based on output signals from one or more sound detectors in a given sound detection module may now be described. Generally stated, a method 200 in accordance with a sound analyzer feature of the present invention extracts sound signatures from ambient noises using mathematical transformations. Mathematical decision making algorithms are provided to cluster sounds into occupant- or non-occupant-caused sound clusters, such that a second occupancy state associated with the sound detectors is representative of either human occupancy or the lack thereof.

In a first step (step 202), output signals from the plurality of sound detectors (e.g., omnidirectional microphones) representative of ambient sounds in a defined area are received by analog sound analyzing circuitry. In various embodiments the plurality of sound detector outputs are provided as independent channels of an input signal to a pre-amplifier circuit 18 and pre-amplified individually.

The individual pre-amplified sound signals may then (in step 204) be provided to one or more analog filters and independently filtered to attenuate frequencies outside of a predetermined range. In an embodiment, the analog filters used in this process are of the band pass type and attenuate frequencies above or below first and second filter thresholds, respectively, to eliminate low and high frequency interferences otherwise present in the environment. These first two steps may in certain embodiments be optional based on expected levels of undesirable ambient noises present in sound samples and/or the need to reduce computational loads in the processing circuitry of the sound analyzer.

The multiple filtered channels of sound may then be averaged and sampled (step 206) using, for example, a 10-bit analog to digital converter (A/D). The A/D in an embodiment may take 36,000 samples per second of ambient sounds in the defined area or otherwise proximate the plurality of sound detectors.

The samples are then sent to and stored in a memory unit via the main processor (step 208). The memory unit in an embodiment is capable of storing up to four seconds' worth of sound samples, and may accordingly function in a manner known in the art as a first-in first-out (FIFO) buffer for the sound samples.

In various embodiments the last second of samples are used to determine an occupancy state in the defined area based on the sound signatures present in the samples. If the sound analyzer (or local control circuit) is determined to be enabled (i.e., "yes" in response to the query of step 210), the process continues to step 212. Otherwise, where the sound analyzer is determined to be disabled (i.e., "no" in response to the query of step 210), the process returns to step 202 and repeats.

In various embodiments the sound analyzer may include an auto-adapt feature which adapts to the environment in a defined area over time by varying coefficients or sorting criteria which are used to determine the occupancy state. The auto-adapt feature may be disabled via for example manual manipulation of DIP switches coupled to or otherwise integrated with the sound detection module.

If the auto-adapt feature is disabled (i.e., "no" in response to the query of step 212), or otherwise not enabled such as for example where not included or otherwise available in the sound analyzer, the process continues to step 218. The subsequent steps may then be performed using sorting criteria which in various embodiments may be sorting criteria initially provided with the sound analyzer, current user settings, or alternatively the last auto-adapted sorting criteria prior to the auto-adapt features having been disabled.

If the auto-adapt feature is enabled (i.e., "yes" in response to the query of step 212) the processor may identify and "learn" sound characteristics in the defined area which are associated with regular occupancy. If a sound has been detected frequently while for example an associated or otherwise proximately located motion detector has likewise sensed occupancy, the auto-adapt feature may learn the sound and cluster it as a valid occupancy sound signature for use at a later time. With respect to the steps of the method as represented herein, the auto-adapt feature in step 214 identifies sound characteristics for the sound samples stored in the last stage FIFO buffer and in step 216 automatically adjusts the coefficients in the sound analyzer and thereby the sorting criteria in accordance with the identified sound characteristics.

As a practical matter, the auto-adapt process takes place over an extended period of time as sound samples accumulate and sound signatures can be identified and properly clustered, meaning that an identification of sound characteristics and an automatic adjustment of the sorting criteria will generally not be performed with each cycle of the method 200. Rather, the auto-adapt process of the sound samples as they are collected, stored and analyzed takes place substantially continuously when enabled, and coincident with determination of the occupancy state.

In one embodiment, the auto-adapt process is implemented using an artificial neural network (ANN) routine. The last second of sound samples may be loaded into the processor when the sound analyzer is enabled and accordingly fed into a first layer of the ANN. An ANN as known in the art is a mathematical model or computational model that is inspired by the structure and/or functional aspects of biological neural networks. It includes an interconnected group of artificial neurons and processes information using a connectionist approach to computation. In many cases an ANN is an adaptive system that changes its structure based on external or internal information that flows through the network during a learning phase. Modern neural networks are non-linear statistical data modeling tools. They are usually used to model complex relationships between inputs and outputs or to find patterns in data.

The particular type of ANN and associated mathematical algorithms relied upon in the embodiment may vary within the scope of the present invention, and various such routines as are presently known in the art may be provided to perform the sound analyzing steps defined herein.

Another application of the auto-adapt feature may be adjusting a predetermined timeout period of the sound detection module. An example could be a storage room where a default timeout is set to fifteen minutes during a commissioning process for the system. The sound analyzer may recognize that the room has always been occupied for less than five minutes, and intervals between occupancies have been considerably longer than the timeout itself. The auto-adapt feature here may regulate the timeout period gradually and continue to adjust itself over time if there are further changes in the occupancy pattern of the defined area.

Referring now to step 218, features or sound signatures associated with the last second of sound samples in the FIFO buffer may be classified based on the sorting criteria. The occupancy state may then be determined in step 220 based on the classification of the sound samples as relating to occupancy of the defined area or merely ambient sounds within the scope of the default sorting criteria or as learned by the system from previous experience.

The previous detailed description has been provided for the purposes of illustration and description. Thus, although there have been described particular embodiments of the present invention of a new and useful "Network of Dual Technology Occupancy Sensors and Associated Lighting Control Method," it is not intended that such references be construed as limitations upon the scope of this invention except as set forth in the following claims.

What is claimed is:

1. An occupancy detection network comprising:
   one or more motion detection modules configured to be positioned in each of one or more defined areas and each effective to provide an output signal based on detected motion in an associated area;
   one or more sound detection modules comprising
      one or more sound detectors and a filtering circuit coupled to receive input signals from the sound detectors and to individually filter signals from the one or more sound detectors that are outside of a predetermined frequency range,
      an analog to digital signal converter effective to average and sample the filtered sound detector signals, and
      a memory buffer effective to receive the averaged and sampled sound detector signals and store the signals in at least one buffer stage,
   the one or more sound detection modules configured to be positioned in each of the defined areas and each of the sound detection modules effective to
      extract a plurality of sound characteristics from ambient sounds in the associated defined area,
      identify one or more of the plurality of sound characteristics as being associated with occupancy in the associated defined area, based at least in part on detection of the one or more sound characteristics over time in association with output signals from an associated one or more motion detection modules representative of detected motion in the same defined area,
      automatically adjust one or more sorting criteria over time in accordance with the identified sound characteristics,
      classify sound as detected occupancy sound in the associated defined area based on a comparison of the sampled signals stored in the buffer in with either initial predetermined sorting criteria or automatically adjusted sorting criteria, and
      provide an output signal based on detected occupancy sound in the associated area;
   each of said motion detection modules and said sound detection modules configured to be assigned an address associated with an area in which they are positioned; and
   a central lighting controller configured to be functionally linked to each of the motion detection modules and sound detection modules via a common bidirectional data bus, and effective to
      receive an output signal from a detection module,
      determine an occupancy state for a defined area associated with the detection module that provided the output signal,
      confirm the determined occupancy state by generating a query for the status of each detection module having an address associated with the defined area, and
      control one or more associated lighting devices to be turned on and off in accordance with the determined and confirmed occupancy state.

2. The network of claim 1, wherein:
   each of said motion detection modules is further effective to generate an ON output signal when motion is detected in the defined area during an OFF lighting state, and to generate an OFF output signal when a predetermined timeout period lapses with no motion detected during an ON lighting state; and
   each of said sound detection modules is further effective to generate an ON output signal when occupancy sound is detected in the defined area during an OFF occupancy state, and to generate an OFF output signal when a predetermined timeout period lapses with no occupancy sound detected during an ON lighting state.

3. The network of claim 2, wherein one or more of said detection modules is further effective to identify occupancy timeout patterns and to automatically adapt the predetermined timeout period from an initial timeout period setting to an adjusted timeout period setting based on the identified patterns.

4. The network of claim 2, wherein the central lighting controller is further effective to determine an occupancy state associated with a defined area by receiving an ON output signal from a motion detection module or a sound detection module during an OFF lighting state or an OFF output signal from a motion detection module or a sound detection module during an ON lighting state, and generating a query for the source of the detection module providing the received output signal.

5. The network of claim 4, wherein:
   the central lighting controller is configured to control the one or more lighting devices in a defined area to be turned ON in response to an ON output signal received from a motion detection circuit having an address associated with the defined area; and
   the central lighting controller is further configured to confirm the determined occupancy state in response to an ON output signal received from a sound detection circuit or an OFF output signal received from a motion or sound detection circuit.

6. The network of claim 1, further comprises a local control circuit associated with the at least one sound detection module effective to execute an artificial neural network routine for comparing the sampled sound detector output signals with either initial predetermined sorting criteria or automatically adjusted sorting criteria to provide the sound detection module output.

7. A method of controlling illumination from lighting devices in a plurality of defined areas comprising the steps of:
   providing output signals from one or more of a plurality of motion detection modules based on detected motion in associated defined areas;
   for each of a plurality of sound detection modules,
      receiving input signals from associated sound detectors and individually filtering signals from the sound detectors that are outside of a predetermined frequency range,
      averaging and sampling the filtered sound detector signals,
      storing the signals in at least one buffer stage,
      extracting a plurality of sound characteristics from ambient sounds in the associated defined area,
      identifying one or more of the plurality of sound characteristics as being associated with occupancy in the associated defined area, based at least in part on detection of the one or more sound characteristics over time in association with output signals from an associated one or more motion detection modules representative of detected motion in the same defined area, automatically adjusting one or more sorting criteria over time in accordance with the identified sound characteristics, classifying sound as detected occupancy sound in the associated defined area based on a comparison of the sampled signals stored in the buffer with either initial predetermined sorting criteria or automatically adjusted sorting criteria, and providing an output signal based on detected occupancy sound in the associated area;

receiving at a central lighting controller an output signal from one of the plurality of motion detection modules and sound detection modules positioned among the plurality of defined areas, said detection modules each having an address associated with a defined area in which it is positioned and collectively defining a network of detection modules functionally linked to each other and to the controller via a common data bus;

determining which of the plurality of detection modules sent the output signal and the address associated with said detection module;

determining an occupancy state associated with the address;

confirming the determined occupancy state by generating a query for a status of each detection module having the same address; and controlling one or more lighting devices in the defined area associated with the address to be turned on and off in accordance with the determined and confirmed occupancy state.

8. The method of claim 7, the step of determining an occupancy state associated with the address further comprising:

receiving an ON output signal from a motion detection module or a sound detection module during an OFF lighting state or an OFF output signal from a motion detection module or a sound detection module during an ON lighting state; and generating a query for the address and type of the detection module providing the received output signal.

9. The method of claim 8, further comprising the steps of:

controlling the one or more lighting devices in a defined area to be turned ON in response to an ON output signal received from a motion detection module having an address associated with the defined area; and confirming the determined occupancy state in response to an ON output signal received from a sound detection module or an OFF output signal received from a motion or sound detection module.

10. The method of claim 9, further comprising the steps of:

confirming the determined occupancy state in response to an ON output signal received from a sound detection module by submitting a query to one or more motion detection modules having the same address as the sound detection module providing said ON output signal; and based on any of said one or more motion detection modules having an ON status, controlling the one or more associated lighting devices to be turned on.

11. The method of claim 9, further comprising the steps of:

confirming the determined occupancy state in response to an OFF output signal received from a sound detection module by submitting a query to one or more motion detection modules having the same address as the sound detection module providing said OFF output signal; and based on any of said one or more motion detection modules having an ON status, controlling the one or more associated lighting devices to remain on.

12. The method of claim 9, further comprising the steps of:

confirming the determined occupancy state in response to an OFF output signal received from a sound detection module by submitting a query to one or more motion detection modules having the same address as the sound detection module providing said OFF output signal, and based on each of said one or more motion detection modules having an OFF status, controlling the one or more associated lighting devices to be turned off.

\* \* \* \* \*